(12) United States Patent
Anderson et al.

(10) Patent No.: US 11,695,792 B2
(45) Date of Patent: *Jul. 4, 2023

(54) LEVERAGING SYNTHETIC TRAFFIC DATA SAMPLES FOR FLOW CLASSIFIER TRAINING

(71) Applicant: Cisco Technology, Inc., San Jose, CA (US)

(72) Inventors: Blake Harrell Anderson, Chapel Hill, NC (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/142,533

(22) Filed: Jan. 6, 2021

(65) Prior Publication Data

US 2021/0160268 A1 May 27, 2021

Related U.S. Application Data

(63) Continuation of application No. 15/364,933, filed on Nov. 30, 2016, now Pat. No. 10,904,275.

(51) Int. Cl.
*H04L 29/06* (2006.01)
*G06N 20/00* (2019.01)
(Continued)

(52) U.S. Cl.
CPC ......... *H04L 63/1425* (2013.01); *G06N 20/00* (2019.01); *H04L 41/16* (2013.01);
(Continued)

(58) Field of Classification Search
CPC . H04L 63/1425; H04L 41/16; H04L 47/2441; H04L 63/1458; H04L 2463/141;
(Continued)

(56) References Cited

U.S. PATENT DOCUMENTS 6,088,804 A * 7/2000 Hill ........................ G06F 21/554
726/25
6,298,351 B1 10/2001 Castelli et al.
(Continued)

FOREIGN PATENT DOCUMENTS

CN 102957579 A 3/2013
EP 3 076 326 A1 10/2016

OTHER PUBLICATIONS

Anderson, et al., "Deciphering Malware's use of TLS (without Decryption)", https://arxiv.org/pdf/1607.01639v1, 15 pages, Jul. 2016, arXiv:1607.01639v1, arXiv.
(Continued)

*Primary Examiner* — Darshan I Dhruv
(74) *Attorney, Agent, or Firm* — Behmke Innovation Group LLC; James M. Behmke; Jonathon P. Western

(57) ABSTRACT

In one embodiment, a device in a network receives traffic data regarding a plurality of observed traffic flows. The device maps one or more characteristics of the observed traffic flows from the traffic data to traffic characteristics associated with a targeted deployment environment. The device generates synthetic traffic data based on the mapped traffic characteristics associated with the targeted deployment environment. The device trains a machine learning-based traffic classifier using the synthetic traffic data.

20 Claims, 6 Drawing Sheets

(51) Int. Cl.
*H04L 12/24* (2006.01)
*H04L 12/851* (2013.01)
*H04L 9/40* (2022.01)
*H04L 41/16* (2022.01)
*H04L 47/2441* (2022.01)

(52) U.S. Cl.
CPC ...... *H04L 47/2441* (2013.01); *H04L 63/1458* (2013.01); *H04L 63/306* (2013.01); *H04L 2463/141* (2013.01); *H04L 2463/144* (2013.01)

(58) Field of Classification Search
CPC .. H04L 2463/144; H04L 63/306; G06N 20/00
See application file for complete search history.

(56) References Cited

U.S. PATENT DOCUMENTS

| | | | | |
|---|---|---|---|---|
| 7,260,846 | B2* | 8/2007 | Day | H04L 63/1408 726/13 |
| 8,161,548 | B1 | 4/2012 | Wan | |
| 8,402,543 | B1* | 3/2013 | Ranjan | H04L 63/1416 713/100 |
| 9,495,188 | B1* | 11/2016 | Ettema | H04L 63/0245 |
| 9,591,020 | B1* | 3/2017 | Aziz | H04L 63/0227 |
| 9,602,531 | B1* | 3/2017 | Wallace | H04L 63/1466 |
| 10,193,901 | B2* | 1/2019 | Muddu | G06F 16/254 |
| 2003/0009699 | A1* | 1/2003 | Gupta | H04L 63/1416 726/23 |
| 2004/0236866 | A1* | 11/2004 | Dugatkin | H04L 41/142 709/224 |
| 2008/0162390 | A1* | 7/2008 | Kapoor | H04L 9/40 706/20 |
| 2010/0153316 | A1* | 6/2010 | Duffield | H04L 41/00 706/47 |
| 2011/0040706 | A1* | 2/2011 | Sen | G06N 20/00 706/12 |
| 2014/0090058 | A1* | 3/2014 | Ward | H04L 63/1433 726/23 |
| 2015/0244730 | A1* | 8/2015 | Vu | G06F 21/566 726/24 |
| 2015/0372980 | A1* | 12/2015 | Eyada | G06F 21/55 726/1 |
| 2016/0248806 | A1* | 8/2016 | Smith | H04L 41/0816 |
| 2016/0292420 | A1* | 10/2016 | Langton | G06F 21/53 |
| 2016/0294858 | A1* | 10/2016 | Woolward | H04L 63/0263 |
| 2017/0063897 | A1* | 3/2017 | Muddu | G06F 16/444 |
| 2017/0230407 | A1* | 8/2017 | Ahmed | H04L 63/1441 |
| 2017/0237773 | A1* | 8/2017 | Wallace | H04L 9/0643 726/22 |
| 2017/0353477 | A1* | 12/2017 | Faigon | H04L 63/1416 |
| 2017/0364794 | A1* | 12/2017 | Mahkonen | H04L 47/2441 |
| 2017/0374089 | A1* | 12/2017 | Anderson | G06N 20/00 |
| 2018/0007578 | A1* | 1/2018 | Drabeck | H04L 41/142 |
| 2018/0131620 | A1* | 5/2018 | Su | H04L 47/2441 |

OTHER PUBLICATIONS

Celik et al., "Salting Public Traces with Attack Traffic to Test Flow Classifiers" Pennsylvania State University, pp. 1-8.

Globerson et al., "Nightmare at Test Time: Robust Learning by Feature Deletion", Proceedings of the 23$^{rd}$ International Conference on Machine Learning, 2006, pp. 1-8.

Phillips et al., "Sample selection bias and presence-only distribution models: implications for background and pseudo-absence data", Ecological Applications, 19(1), 2009, pp. 1-17.

Zarei Roozbeh et al.: "Automated Dataset Generation for Training Peer-to-Peer Machine Learning Classifiers", Journal of Network and Systems Management, Plenum Publishing Co., US, vol. 23, No. 1, Jul. 13, 2013, pp. 89-110.

Kashi Venkatesh Vishwanath et al.: "Realistic and responsive network traffic generation", Computer Communication Review, ACM, New York, NY, US, vol. 36, No. 4, Aug. 11, 2006.

European Search Report dated Jan. 2, 2018 in connection with European Appliation No. 17 20 3669.

\* cited by examiner

LEVERAGING SYNTHETIC TRAFFIC DATA SAMPLES FOR FLOW CLASSIFIER TRAINING

CROSS-REFERENCE TO RELATED APPLICATION

This application is a continuation of U.S. patent application Ser. No. 15/364,933, filed Nov. 30, 2016, entitled "LEVERAGING SYNTHETIC TRAFFIC DATA SAMPLES FOR FLOW CLASSIFIER TRAINING," by Blake Harrell Anderson, et al., the contents of which are incorporated herein by reference.

TECHNICAL FIELD

The present disclosure relates generally to computer networks, and, more particularly, to leveraging synthetic traffic data samples for flow classifier training.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
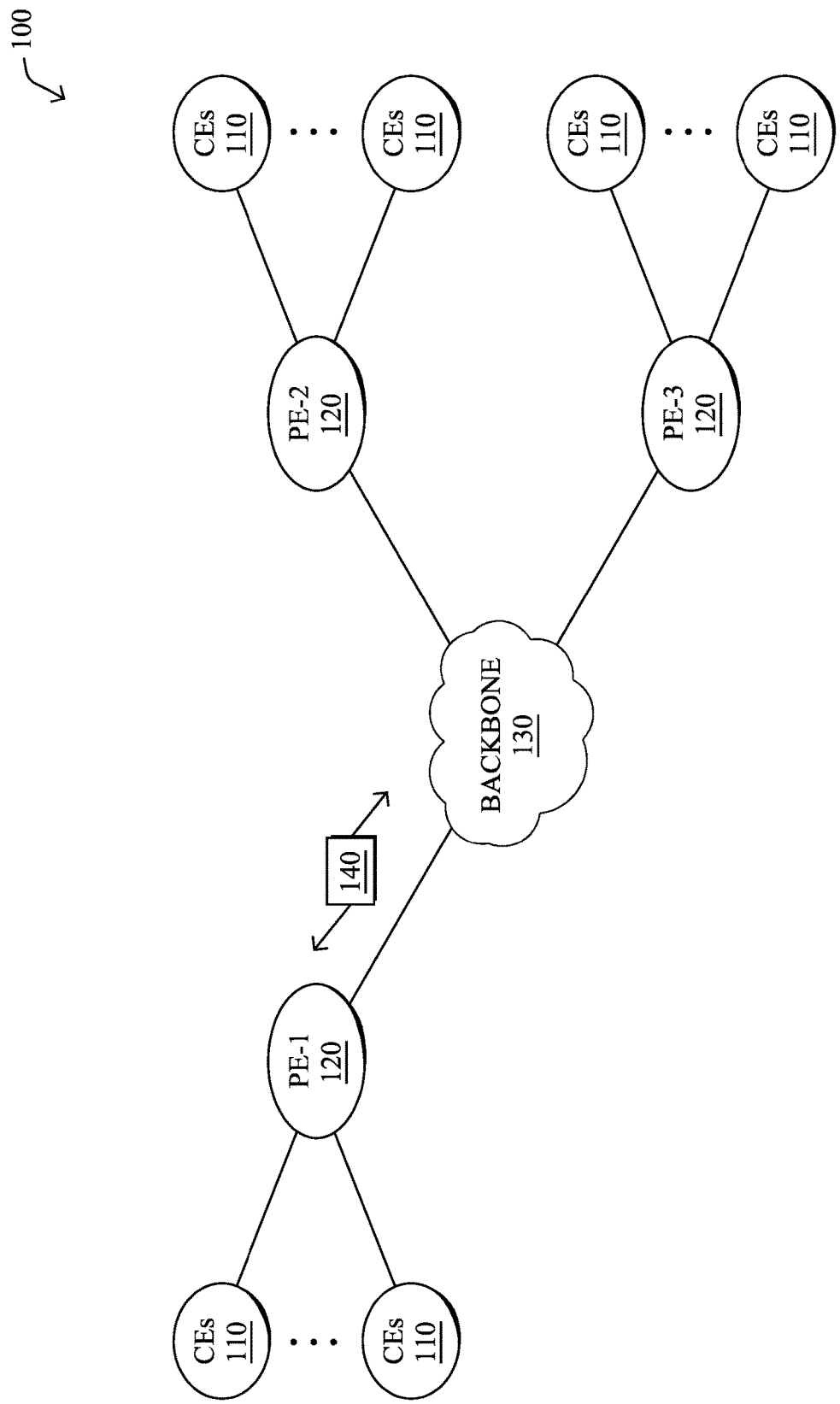
FIGS. 1A-1B illustrate an example communication network.

According to one or more embodiments of the disclosure, a device in a network receives traffic data regarding a plurality of observed traffic flows. The device maps one or more characteristics of the observed traffic flows from the traffic data to traffic characteristics associated with a targeted deployment environment. The device generates synthetic traffic data based on the mapped traffic characteristics associated with the targeted deployment environment. The device trains a machine learning-based traffic classifier using the synthetic traffic data.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
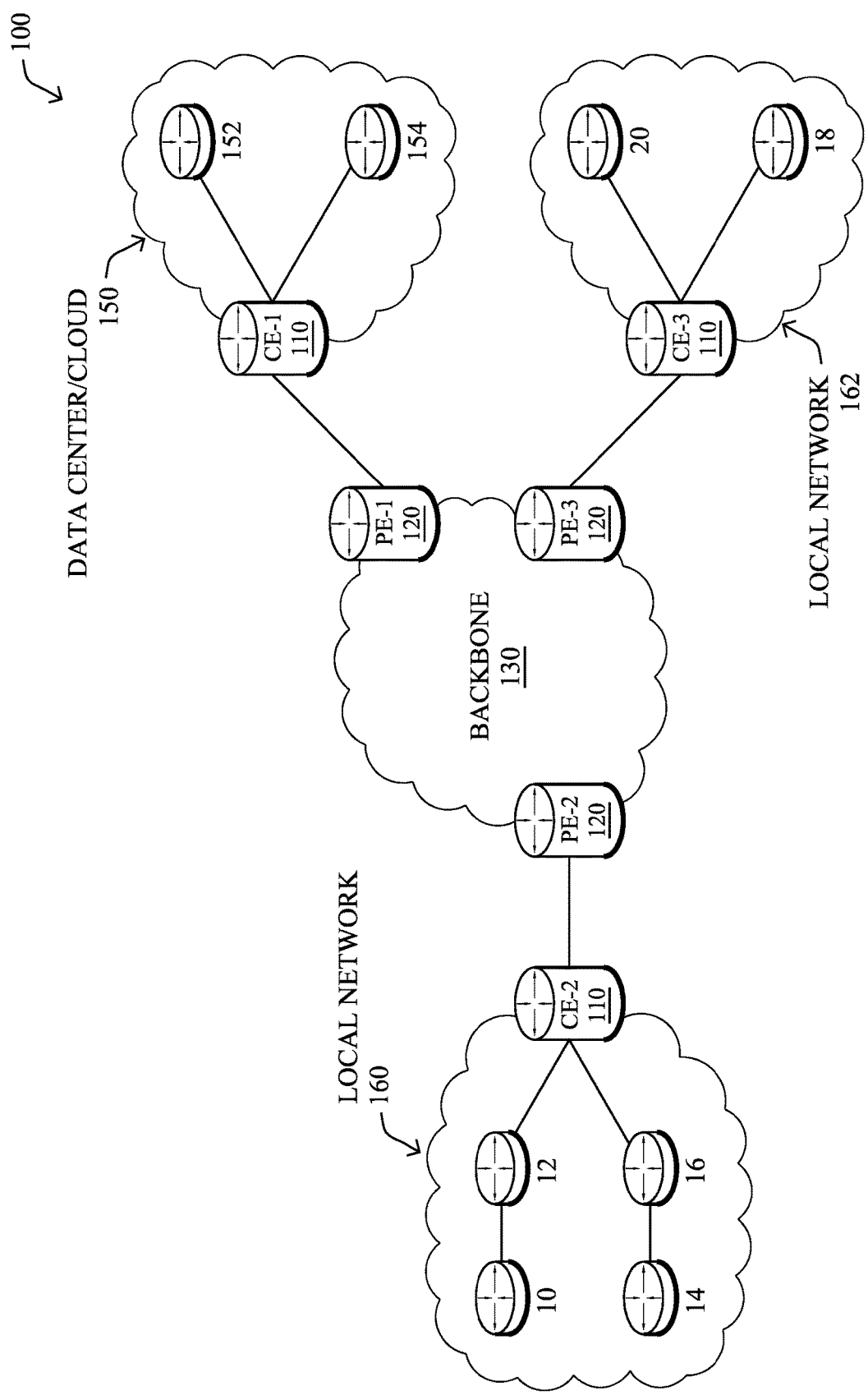

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
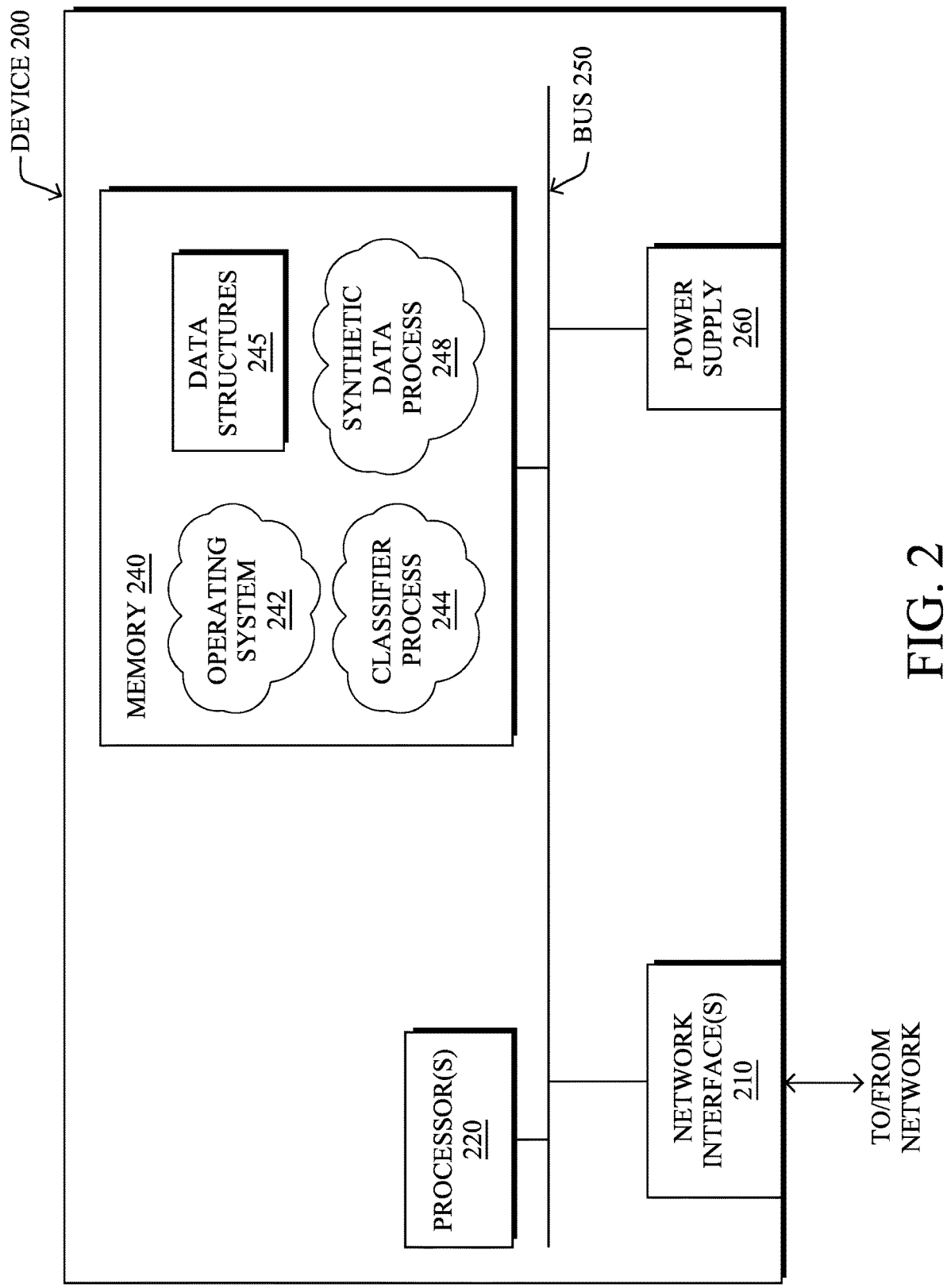
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise classifier process 244 and/or a synthetic data process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, classifier process 244 may execute one or more machine learning-based classifiers to classify traffic data regarding traffic in the network for any number of purposes. In one embodiment, classifier process 244 may assess captured traffic data to determine whether a given traffic flow or set of flows are caused by malware in the network (e.g., whether the traffic flow is considered malicious). Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, classifier process 244 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 244 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 244 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 244 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 244 may assess the captured traffic data on a per-flow basis. In other embodiments, classifier process 244 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Synthetic data process 248, as described in greater detail below, may operate in conjunction with classifier process 244, to train classifier process 244 using synthetic traffic data. Generally speaking, synthetic traffic data refers to traffic data that is not actually observed in the network, but may be used nonetheless as part of the training data set for classifier process 244. Doing so allows for a more robust classifier that can be deployed to networks/environments that differ from that of the observed training data.

Figure 3:
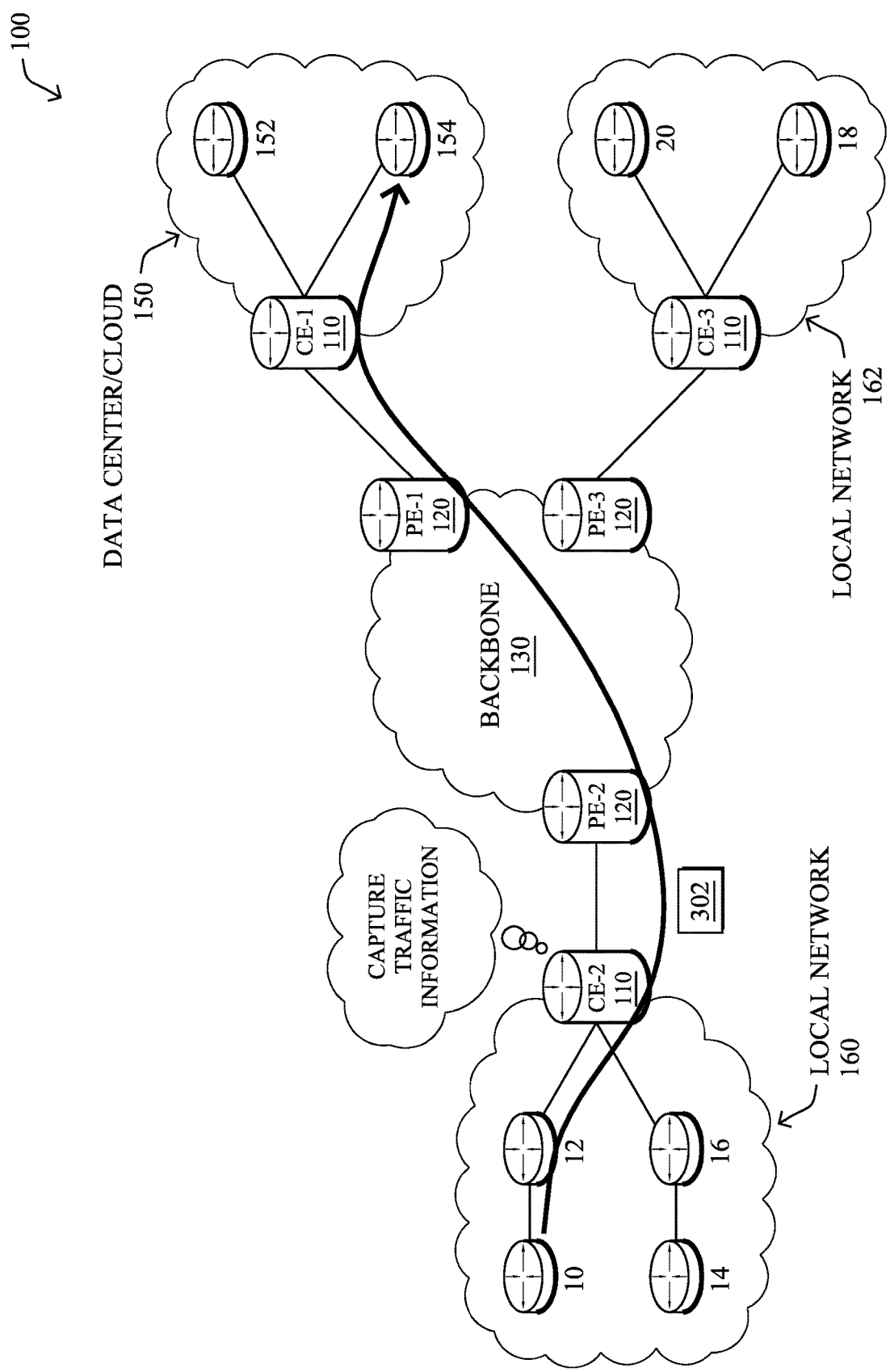
FIG. 3 illustrates an example of a network device capturing traffic data.

As shown in FIG. 3, various mechanisms can be leveraged to capture information about traffic in a network. For example, consider the case in which host node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302. In turn, the capturing device may itself perform analysis of the traffic flows (e.g., to detect malicious/malware-related flows) or provide the captured traffic data to another device in the network that performs such an analysis.

In some cases, an observed traffic flow may also use encryption, which may prevent a networking device from analyzing the packets of the flow in their entirety. Notably, with the advent of transport layer security (TLS) and other security mechanisms, many websites are now encrypting even traditional webpage data. Since the contents of encrypted flows may not be visible to the device (e.g., through DPI, etc.), this presents certain challenges to security systems as pattern matching is generally inapplicable to encrypted traffic. In terms of visibility, being able to detect encrypted traffic over unconventional ports, such as DNS, could indicate out-of-policy tunnels or data exfiltration. More specifically, the detection of cryptographic protocols independent of the ports being utilized gives valuable knowledge to network administrators. In terms of threat detection, characterizing encrypted traffic as malicious has numerous benefits and would allow network administrators to identify when encrypted files transit the network using non-encrypted protocols such as the Hypertext Transfer Protocol (HTTP), which is another data exfiltration method.

It may also be possible to use a man-in-the-middle approach to decrypt and inspect encrypted network traffic. For example, a proxy between a client device and a server may act as an intermediary to obtain the cryptographic information needed to decrypt the traffic. However, such approaches are often cumbersome, raise a number of privacy concerns, and may even be prohibited by law in some jurisdictions.

As noted above, supervised machine learning represents a potential way to detect malicious traffic flows in a network, perform application identification, etc. For these types of operations, it is essential to avoid biases that can arise due to the fact that different training datasets are obtained in different network environments. Unfortunately, it is not straightforward to understand how these environments can introduce biases. Furthermore, it is not straightforward how to leverage this training data once the biases are well understood.

As a specific example, most sandboxes use the XP version of the Windows™ operating system, to maximize the probability that the submitted/tested malware sample is able to be executed. However, as XP is an antiquated version of Windows™, the resulting TLS flows will also take advantage of the operating system's TLS library and use an outdated version of SChannel. In the cases where the malware samples use SChannel, offering obsolete TLS ciphersuites is not an inherent feature of the malware, but is rather a function of the device configuration used in the sandbox environment. Understanding and accounting for these biases is necessary to train machine learning processes that can accurately discern malicious traffic versus that of legitimate enterprise traffic, and not simply learn to classify different network environments.

Leveraging Synthetic Traffic Data Samples for Flow Classifier Training

The techniques herein allow for the generating of synthetic traffic data samples, which can be used to enhance a traffic flow classifier. In some aspects, given a set of labeled, network-based training data and an understanding of the target network to which the classifier is to be deployed, the techniques herein can be used to modify the samples in the observed training dataset to match the data distribution of the target network. This allows for the generation of customized machine learning classifiers for specific network environments that help to reduce the number of false positives.

Specifically, according to one or more embodiments of the disclosure as described in detail below, a device in a network receives traffic data regarding a plurality of observed traffic flows. The device maps one or more characteristics of the observed traffic flows from the traffic data to traffic characteristics associated with a targeted deployment environment. The device generates synthetic traffic data based on the mapped traffic characteristics associated with the targeted deployment environment. The device trains a machine learning-based traffic classifier using the synthetic traffic data.

Illustratively, the techniques described herein may be performed by hardware, software, and/or firmware, such as in accordance with the synthetic data process 248, which may include computer executable instructions executed by the processor 220 (or independent processor of interfaces 210) to perform functions relating to the techniques described herein, e.g., in conjunction with classifier process 244.

Figure 4:
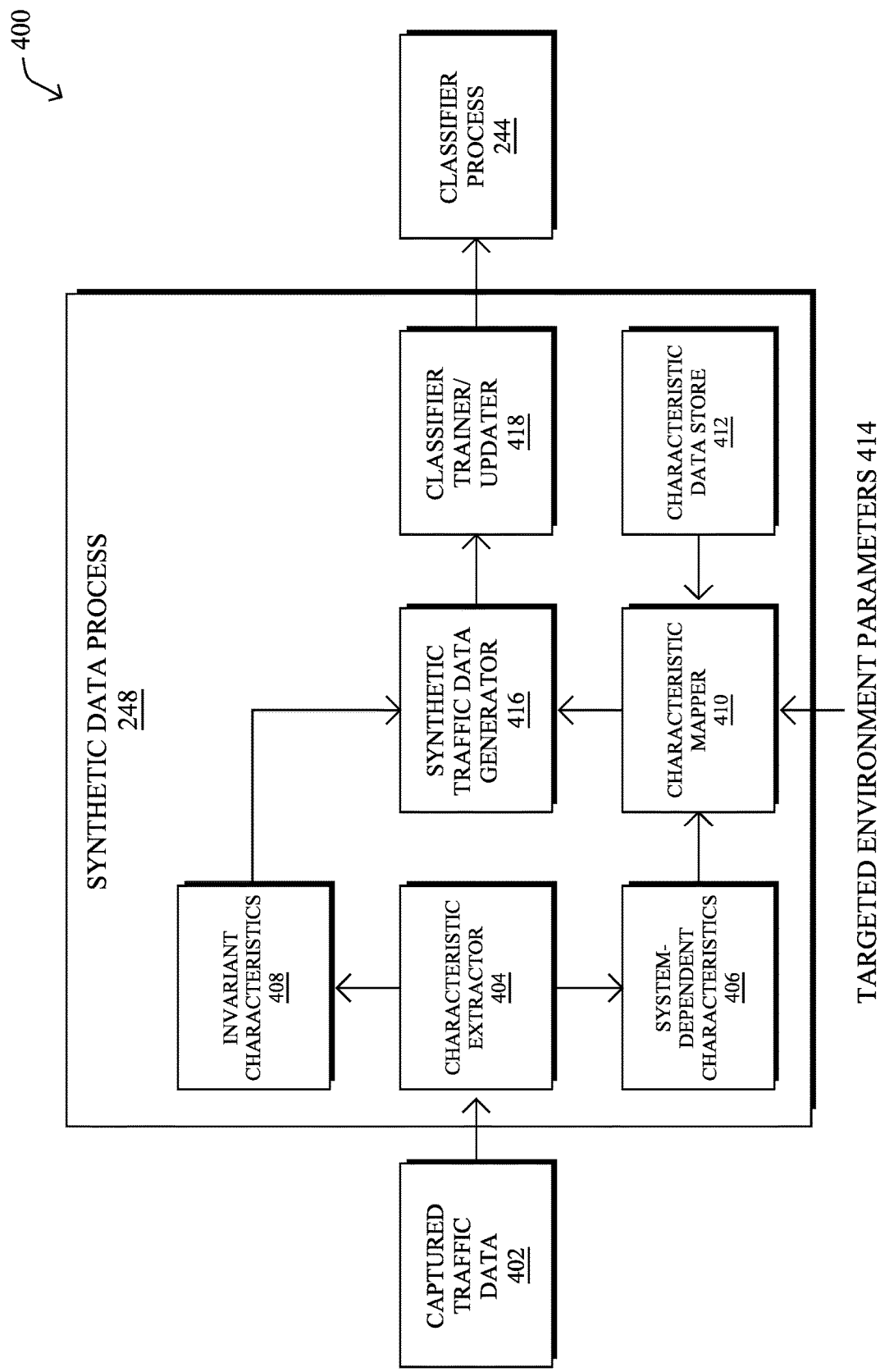
FIG. 4 illustrates an example architecture for generating synthetic traffic data.

Operationally, an example architecture for generating synthetic traffic data is illustrated in FIG. 4, according to various embodiments. As shown, synthetic data process 248 may include any number of sub-processes and access any number of data stores, either locally or across a number of distributed devices. Generally, synthetic data process 248 may be configured to generate synthetic traffic data based on captured traffic data 402 regarding actual traffic flows observed in one or more environments.

In some embodiments, captured traffic data 402 may be captured by one or more devices operating in a sandbox testing environment. For example, to obtain training data regarding malware-related traffic flows, one or more devices in the sandbox environment may be infected with the malware. In turn, traffic data 402 may be captured from any of the resulting traffic flows from the infected devices. Further embodiments provide for captured traffic data 402 to include information regarding traffic flows observed in one or more live environments/networks, as well.

Captured traffic data 402 may generally include information obtained from analysis of the observed traffic flows. For example, captured traffic data 402 may include traffic characteristics such as, but not limited to, TLS-related information of the flows (e.g., the cipersuite used, the advertised TLS extensions, etc.), DNS-related information, HTTP header fields (e.g., proxy, user agent, etc.), an advertised security extension, a proxy-related header field, packet length information (e.g., a network maximum transmission unit (MTU) in use by the flow packets, a network maximum segment size (MSS) in use by the flow, etc.), inter-packet timing information, a Hypertext Transfer Protocol (HTTP) header field, or any other information that can be captured through analysis of the packets of the traffic flows (e.g., through analysis of the packet headers, the payloads of unencrypted packets, etc.). In some cases, the device executing synthetic data process 248 may be configured capture traffic data 402 directly (e.g., by analyzing traffic that flows through the device itself). In other cases, the device executing synthetic data process 248 may receive some or all of captured traffic data 402 from one or more other networking devices.

Synthetic data process 248 may include a characteristic extractor 404 configured to extract and assess the various traffic characteristics from captured traffic data 402. Generally, characteristic extractor 404 may be configured to distinguish between invariant traffic flow characteristics and system-dependent traffic characteristics in captured traffic data 402.

In particular, certain traffic characteristics may not exhibit any variation across different types of source devices, while other traffic characteristics may vary considerably. For example, during operation, characteristic extractor 404 may compare each traffic characteristic in captured traffic data 402 to a hardcoded or configurable list of characteristics and characteristic types (e.g., system-dependent vs. invariant). In turn, characteristic extractor 404 may separate the traffic characteristics in captured traffic data 402 into a set of system-dependent characteristics 406 and invariant characteristics 408. The separated characteristics 406-408 may also be labeled with the known traffic type (e.g., malware-related vs. benign, one application type vs. another, etc.) and/or the configurations of the devices used in the source environment of traffic data 402.

By way of example, consider the case of TLS-related parameters. A feature vector based on such parameters can be generalized to produce two subsets of features:

1.) Features that are associated with the TLS protocol that are invariant to the underlying/source environment. For example, the server certificate associated with a traffic flow is not typically dependent on the sandbox environment.

2.) Features that are also associated with the TLS protocol, but are artifacts of the underlying/source environment. For example, if the malware sample used the Windows™-provided SChannel, the artifact features would include the corresponding ciphersuites and extensions offered.

Synthetic data process 248 may further include a characteristic mapper 410 that is configured to map the system dependent characteristics 406 to traffic flow characteristics in the targeted deployment environment. Accordingly, synthetic data process 248 may receive targeted environment parameters 414 that are indicative of the device configurations and/or traffic flow characteristics in use in the environment(s) to which the traffic flow classifier is to be deployed. For example, if the targeted deployment environment includes non-Windows™-based devices or Windows™-based devices that use a different version than in the sandbox environment, parameters 414 may include a listing of these configurations and/or the traffic flow characteristics associated with these configurations.

If parameters 414 indicate only the device configurations in the targeted deployment environment(s), characteristic mapper 410 may first translate these configurations into traffic flow characteristics by matching the configurations to characteristics stored in a characteristic data store 412. For example, if system-dependent characteristics 406 indicate that they were generated in a sandbox environment running Windows XP™ and parameters 414 indicate that the targeted environment includes devices running Windows 10™, characteristic mapper 410 may look up the corresponding mapping between device configurations, to map the system-dependent traffic characteristics 406 to those expected in the targeted deployment environment(s).

In various embodiments, synthetic data process 248 may include a synthetic traffic generator 416. Generally, synthetic traffic generator 416 may be configured to generate synthetic traffic data based on the mapped traffic flow characteristics from characteristic mapper 410, as well as potentially the invariant characteristics 408 of captured traffic data 402. For example, synthetic traffic data generator 416 may generate feature vectors that include traffic characteristics that are more representative of the traffic that is likely to be found in the targeted deployment environment(s). Labels associated with the original traffic data may further be carried through to the synthetic traffic data. For example, if a set of synthetic traffic data is generated from observed traffic data that is known to have been generated by malware, the resulting synthetic traffic data after mapping may similarly be associated with the malware-related label.

Returning again to the previous example of TLS-related traffic characteristics generated by sandbox devices running Windows XP™, assume that the majority of devices in the targeted deployment environment instead run Windows 10™ (e.g., as indicated in parameters 414, which may be captured automatically or input manually by an administrator). In such a case, synthetic data process 248 may modify the TLS-related traffic flows from the received training dataset that were generated by devices executing the XP version of SChannel to have characteristics/features that instead resemble those of the version of SChannel associated with Windows 10. Said differently, the training dataset from the sandbox/testing/source environment may be used to create synthetic traffic data samples that resemble the environment to which the classifier will be deployed.

Synthetic data process 248 may further include a classifier trainer/updater 418 that is configured to train and/or update classifier process 244. More specifically, classifier trainer/updater 418 may construct a training dataset that comprises features from the generated synthetic traffic data, their corresponding labels. In some cases, trainer/updater 418 may also include features/characteristics from the actually observed traffic flows in the training dataset, as well. In turn, trainer/updater 418 may use the constructed training dataset to train or update classifier process 244. In doing so, classifier process 244 may be better suited to classify the traffic flows present in the targeted environment(s) to which classifier process 244 is to be deployed.

To evaluate the proposed techniques, a training dataset was constructed based on a set of 10,000 randomly selected TLS flows from ThreatGRID™ from Cisco Systems, Inc. and another set of 10,000 randomly selected TLS flows from a representative enterprise network. From this training dataset, it was noted that approximately 65% of the ThreatGRID™ flows used a TLS library offered by the default Windows XP™ system, whereas less than 1% of the enterprise TLS flows used this library.

The constructed training dataset was then modified to have characteristics associated with the TLS library provided by Windows 7™, as opposed to the library associated with Windows XP™. Notably, the TLS offered ciphersuite vectors and advertised extension list of the malicious TLS flows that used a Windows™-provided library in theced-GRID™ training dataset were changed to match the distribution of Windows™ libraries found on the enterprise network.

Without modifying the original training dataset, the resulting traffic classifier was only able to accurately classify 10% of the malicious TLS flows. However, by retraining the classifier using the synthetic traffic data, the classifier was able to correctly classify 85% of the malicious TLS flows. The true negative rate of both experiments was 98-99%.

Figure 5:
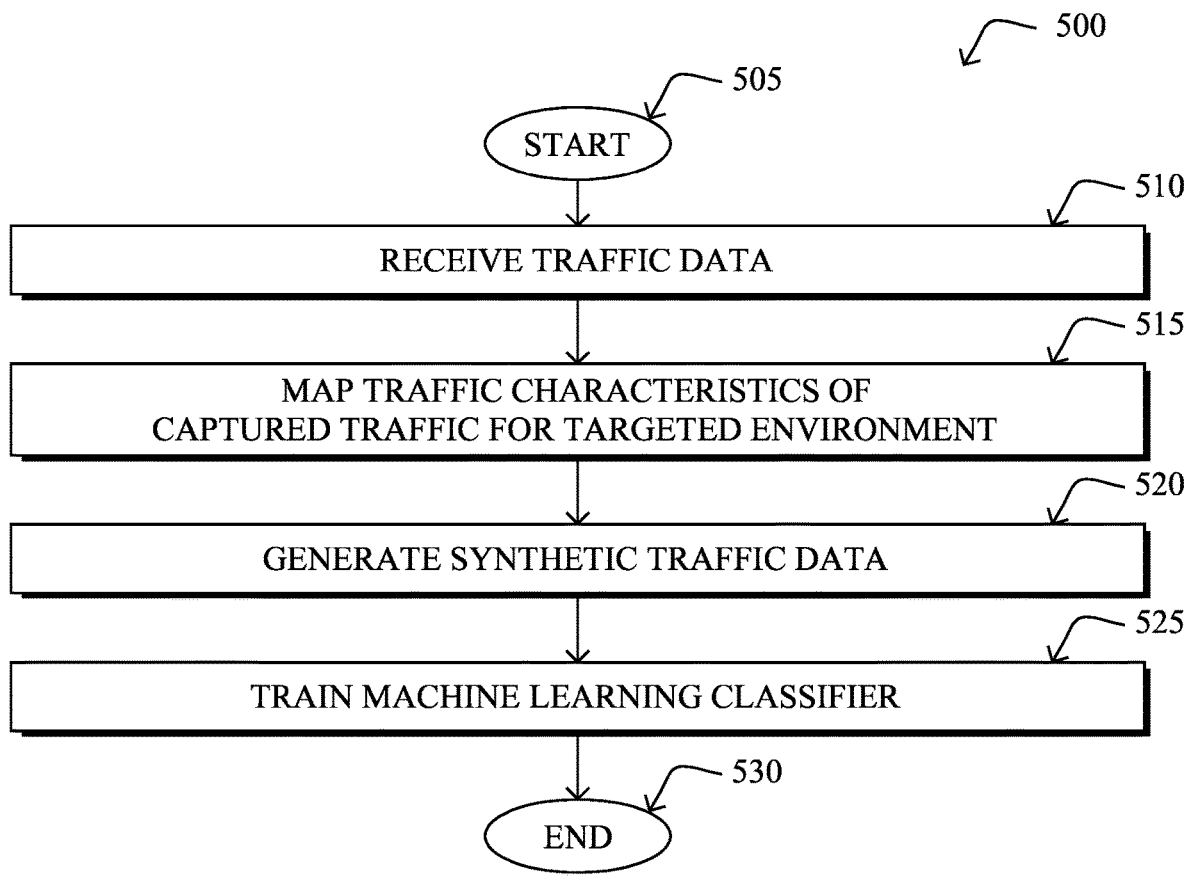
FIG. 5 illustrates an example simplified procedure for leveraging synthetic traffic data samples for flow classifier training.

FIG. 5 illustrates an example simplified procedure for leveraging synthetic traffic data samples for flow classifier training, according to one or more embodiments herein. For example, a non-generic, specifically configured device (e.g., device 200) may perform procedure 400 by executing stored instructions (e.g., process 248). The procedure 500 may start at step 505, and continues to step 510, where, as described in greater detail above, the device may receive traffic data regarding a plurality of observed traffic flows. For example, in some cases, the received traffic data may include traffic flows from a sandbox in which malware is executed and/or from a live networking environment. In other words, the received traffic data may be labeled according to the desired set of output labels for the classifier being trained (e.g., to distinguish malware-associated traffic flows, to identify an application associated with a traffic flow, etc.). Generally, the received traffic data may include any number of traffic characteristics of the observed traffic flows (e.g., header field values, TLS parameters, etc.).

At step 515, as detailed above, the device may map one or more of the traffic characteristics of the observed traffic flow data to traffic characteristics associated with an environment to which the classifier is targeted to be deployed. In some embodiments, the device may map the system-dependent flow characteristics of the observed traffic flows to flow characteristics associated with the device configurations in the targeted deployment environment. For example, the device may map certain TLS-related traffic characteristics that are system-dependent (e.g., Windows XP™ vs. Windows 7™, etc.) to those that correspond to the configuration(s) of the devices in the deployment environment.

At step 520, the device may generate synthetic traffic data based on the mapped characteristics from step 515, as described in greater detail above. Generally, the traffic data may be considered "synthetic" as it does not require the sending of any actual traffic in the network. The synthetic traffic data may also be of a form similar to that of the observed traffic data from step 510. Example system-dependent characteristics in the synthetic traffic data that may be varied based on the targeted environment may include, but are not limited to, TLS-related information of the flows (e.g., the cipersuite used, the advertised TLS extensions, etc.), DNS-related information, HTTP header fields, inter-packet timing information, packet size/length information, a network MTU, a network MSS, or any other information that can be captured through analysis of the packets of the traffic flows.

At step 530, as detailed above, the device may use the synthetic traffic data to train a machine learning-based traffic classifier. In various cases, the classifier may be configured to identify malicious/malware-related traffic flows, distinguish between different source applications for the flows, or perform other traffic classifications. For example, if the observed traffic data from step 510 is labeled "benign" or "malware," the corresponding synthetic traffic data from 525 can be used with these labels to train a classifier that is better suited for the environment to which the classifier will be deployed. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow the traffic data collected in one environment to be leveraged for multiple, different environments. In addition, the techniques herein can be used to increase the robustness and applicability of the learned models by producing a more uniform/complete training dataset tailored to a specific environment. Further, the techniques herein allow for more efficient generation of training data. For example, malware-related traffic samples can be collected from a device with one configuration (e.g., in terms of operating system, installed software, etc.) and used to create synthetic training data for devices with different configurations.

While there have been shown and described illustrative embodiments that provide for leveraging synthetic traffic data for flow classifier training, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, traffic data regarding a plurality of observed traffic flows;
determining, by the device, one or more environment parameters associated with a targeted deployment environment in which a machine learning-based traffic classifier is to be deployed, wherein the targeted deployment environment is different than the network in which the traffic data was received;
modifying, by the device, one or more samples of the plurality of observed traffic flows from the traffic data to match traffic characteristics of the targeted deployment environment based on the one or more environment parameters associated with the targeted deployment environment;
creating, by the device, synthetic traffic data that resembles actual traffic data expected in the targeted deployment environment based on the one or more modified samples, wherein the synthetic traffic data is not actually observed in the network; and
training, by the device, the machine learning-based traffic classifier using the synthetic traffic data for deployment in the targeted deployment environment.

2. The method as in claim 1, wherein the machine learning-based traffic classifier is configured to classify a particular traffic flow as benign or malware-related.

3. The method as in claim 1, wherein the machine learning-based traffic classifier is configured to determine an application associated with a particular traffic flow.

4. The method as in claim 1, further comprising:
after training the machine learning-based traffic classifier using the synthetic traffic data, deploying, by the device, the machine learning-based traffic classifier to the targeted deployment environment.

5. The method as in claim 1, wherein the machine learning-based traffic classifier is further trained using one or more characteristics of the plurality of observed traffic flows.

6. The method as in claim 1, further comprising:
determining, by the device, a configuration of at least one device used in the targeted deployment environment based on the one or more environment parameters associated with the targeted deployment environment; and
modifying, by the device, the one or more samples of the plurality of observed traffic flows from the traffic data in accordance with the configuration of the at least one device used in the targeted deployment environment.

7. The method as in claim 1, wherein at least one of the one or more modified samples corresponds to at least one of: an advertised security extension, a proxy-related header field, packet length information, inter-packet timing information, or a Hypertext Transfer Protocol (HTTP) header field.

8. The method as in claim 1, wherein the plurality of observed traffic flows were generated in a sandbox testing environment.

9. The method as in claim 1, wherein the received traffic data is labeled according to a desired set of output labels for the machine learning-based traffic classifier, and wherein the creating of the synthetic traffic data comprises:
labeling, by the device, the synthetic traffic data using the desired set of output labels.

10. An apparatus, comprising:
one or more network interfaces to communicate with a network;
a processor coupled to the one or more network interfaces and configured to execute one or more processes; and
a memory configured to store a process executable by the processor, the process when executed operable to:
receive traffic data regarding a plurality of observed traffic flows in the network;
determine one or more environment parameters associated with a targeted deployment environment in which a machine learning-based traffic classifier is to be deployed, wherein the targeted deployment environment is different than the network in which the traffic data was received;
modify one or more samples of the plurality of observed traffic flows from the traffic data to match traffic characteristics of the targeted deployment environment based on the one or more environment parameters associated with the targeted deployment environment;
create synthetic traffic data that resembles actual traffic data expected in the targeted deployment environment based on the one or more modified samples, wherein the synthetic traffic data is not actually observed in the network; and
train the machine learning-based traffic classifier using the synthetic traffic data for deployment in the targeted deployment environment.

11. The apparatus as in claim 10, wherein the machine learning-based traffic classifier is configured to classify a particular traffic flow as benign or malware-related.

12. The apparatus as in claim 10, wherein the machine learning-based traffic classifier is configured to determine an application associated with a particular traffic flow.

13. The apparatus as in claim 10, wherein, after training the machine learning-based traffic classifier using the synthetic traffic data, the process when executed is further operable to:
deploy the machine learning-based traffic classifier to the targeted deployment environment.

14. The apparatus as in claim 10, wherein the machine learning-based traffic classifier is further trained using one or more characteristics of the plurality of observed traffic flows.

15. The apparatus as in claim 10, wherein the process when executed is further operable to:
determine a configuration of at least one device used in the targeted deployment environment based on the one or more environment parameters associated with the targeted deployment environment; and
modify the one or more samples of the plurality of observed traffic flows from the traffic data in accordance with the configuration of the at least one device used in the targeted deployment environment.

16. The apparatus as in claim 10, wherein at least one of the one or more modified samples corresponds to at least one of: an advertised security extension, a proxy-related header field, packet length information, inter-packet timing information, or a Hypertext Transfer Protocol (HTTP) header field.

17. The apparatus as in claim 10, wherein the observed traffic flows were generated in a sandbox testing environment.

18. The apparatus as in claim 10, wherein the received traffic data is labeled according to a desired set of output labels for the machine learning-based traffic classifier, and wherein the synthetic traffic data is created by:

labeling the synthetic traffic data using the desired set of output labels.

19. A tangible, non-transitory, computer-readable medium storing program instructions that cause a device in a network to execute a process comprising:

receiving, at the device, traffic data regarding a plurality of observed traffic flows;

determining, by the device, one or more environment parameters associated with a targeted deployment environment in which a machine learning-based traffic classifier is to be deployed, wherein the targeted deployment environment is different than the network in which the traffic data was received;

modifying, by the device, one or more samples of the plurality of observed traffic flows from the traffic data to match traffic characteristics of the targeted deployment environment based on the one or more environment parameters associated with the targeted deployment environment;

creating, by the device, synthetic traffic data that resembles actual traffic data expected in the targeted deployment environment based on the one or more modified samples, wherein the synthetic traffic data is not actually observed in the network; and training, by the device, the machine learning-based traffic classifier using the synthetic traffic data for deployment in the targeted deployment environment.

20. The computer-readable medium as in claim 19, wherein the machine learning-based traffic classifier is configured to classify a particular traffic flow as benign or malware-related.

\* \* \* \* \*